Jan. 23, 1968

H. A. RAAB 3,365,049

CONVEYOR STRUCTURE

Filed July 19, 1965

INVENTOR.
HILARY A. RAAB
BY
Charles S. Penfold
ATTORNEY

Jan. 23, 1968 H. A. RAAB 3,365,049
CONVEYOR STRUCTURE
Filed July 19, 1965 3 Sheets-Sheet 2
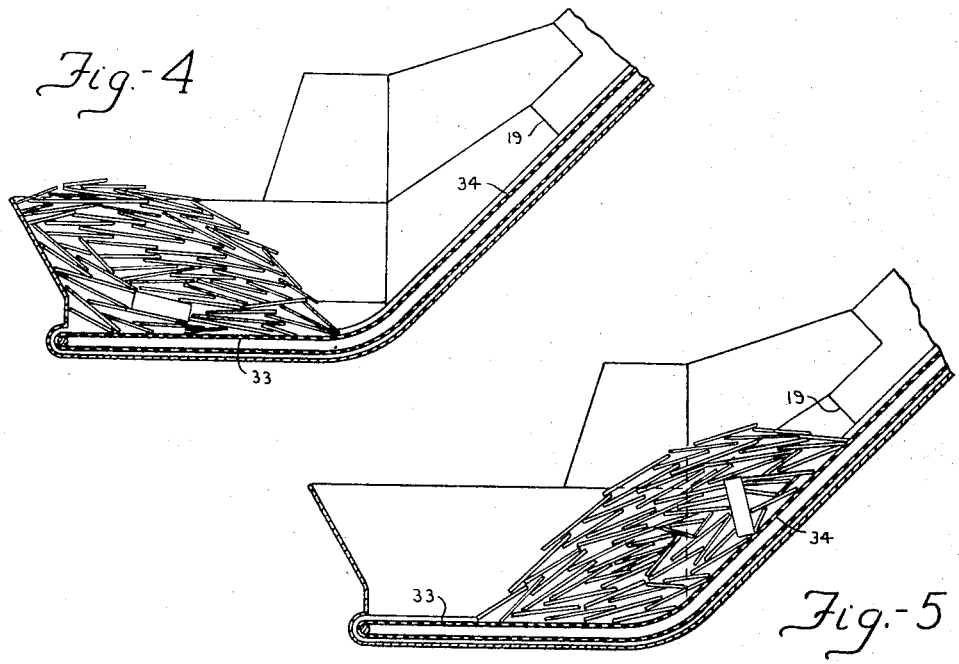
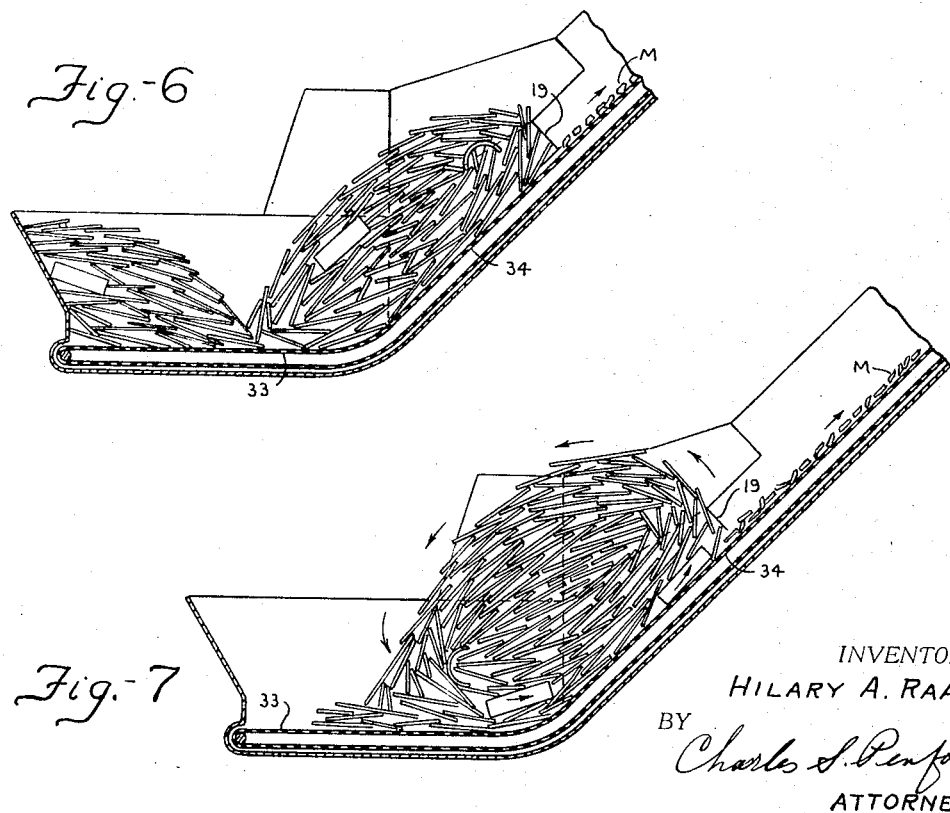
INVENTOR.
HILARY A. RAAB
BY Charles S. Penfold
ATTORNEY INVENTOR.
HILARY A. RAAB
BY Charles S. Penfold
ATTORNEY

United States Patent Office 3,365,049
Patented Jan. 23, 1968

3,365,049
CONVEYOR STRUCTURE
Hilary A. Raab, Hammond, Ind., assignor to East Chicago Machine Tool Corporation, East Chicago, Ind., a corporation of Indiana
Filed July 19, 1965, Ser. No. 478,489
18 Claims. (Cl. 198—57)

The subject invention relates generally to conveyors and more particularly is directed to an improved belt type of conveyor adapted for use with complementary or auxiliary equipment.

The conveyor apparatus embodying the invention may be utilized wherever applicable and is especially designed and constructed to convey bulk material or a product, such as paper, which may be comprised of whole sheets, web waste, magazines and signatures thereof, newspapers and the like to complementary or auxiliary equipment, such as a conventional hogger machine, splitter, shredder, or other size-reducing apparatus.

More particularly, an important objective of the invention is to provide an improved conveyor structure for unpacking, loosening or fluffing pieces of compacted or interlocked material and which, among other things, comprises a receptacle or bin for initially receiving compacted pieces of bulk material or product, inclined wall structure provided with converging or tapering surfaces, conveyor means having a portion or length disposed substantially horizontally in the receptacle and an inclined portion or length associated with the inclined wall structure, and abutment means arranged in a predetermined or operative relationship to the tapering or converging surfaces whereby to impart what may be termed a back rolling or tumbling motion or action to at least some of the product during its travel up the inclined portion for gravitation back into the receptacle whereby to loosen, unlock, shuffle, unpack or fluff the material for substantial uniform distribution and re-travel up said inclined portion and discharge therefrom at a location beyond said abutment means.

A significant object of the invention is to provide an organization whereby the operative relationship between the conveyor apparatus and a size-reducing equipment is synchronized and the relationship between the conveyor apparatus and, for example, a baler, is also synchronized in order to promote correlation and continuity in the operations or an overall automatic flow of the material to be processed. In this connection, provision is preferably made whereby the size-reducing or other equipment serves to control the operation of the conveyor apparatus.

A specific object of the invention is to provide conveyor apparatus for the above purpose which, from the standpoint of reducing labor costs, does not require the services of any attendants to agitate or unpack material while it is being received in a receptacle for transmission to a conveyor.

A particularly important object of the invention is to provide in combination a conveyor apparatus and a receptacle in which the receptacle is of a size and the motion imparted to the material by the conveyor apparatus serve to provide a void in the receptacle whereby to facilitate accommodation or acceptance of the material introduced thereto and gradually present the material to the inclined portion or section of the conveyor belt.

Also, an object of the invention is to provide conveyor apparatus which preferably includes an endless cleated conveyor belt having inclined and horizontal portions respectively associated with the inclined wall structure and receptacle, the latter portion serving to direct the material from the receptacle against the inclined portion.

A specific but important objective of the invention is to provide an organization in which the loosened, unpacked or fluffed material, rolled, churned or revolved back into the receptacle, will be caused to re-travel up the inclined portion of the conveyor means and under the material that is being back rolled whereby to facilitate generally uniform distribution or metering of the loosened material on an upper extremity of the inclined portion in a proper condition for accommodation and by other equipment, such as a size-reducing machine.

Another object of the invention is to provide an improved conveyor apparatus which is adapted for association with an auxiliary machine such as a hogger in a manner whereby the loosened or unpacked material discharged from an upper extremity of the conveyor may gravitate to further unpack or loosen the material prior to being acted upon by the hogger.

Another further object of the invention is to provide one or more improved methods of processing, conditioning or treating a product, including the imparting of a unique motion or motions thereto.

Another object of the invention is to provide an improved combination comprising a conveyor structure and a conditioner machine which are operatively connected in a relatively close parallel relation so that the material is conveyed generally in one direction by the conveyor structure and then laterally to the conditioner for movement in a generally straight and parallel direction opposide to said first-mentioned direction. In other words, the material is caused to travel in a generally U-shaped direction by the conveyor structure and conditioner.

A specific objective of the invention is to provide a combination of the character above referred to in which a lower horizontal section of the conveyor structure is disposed in a well or chamber below floor level whereby to facilitate initial deposit of the material or product to the conveyor structure.

Other objects and advantages of the invention embodied in the disclosure reside in reducing labor costs, providing smooth automatic operation, uniformity in the resultant product, over-all efficiency, and durability.

Additional objects and advantages of the invention will become apparent after the following description is considered in conjunction with the drawings annexed hereto.

In the drawings:

FIGURE 4 is a vertical sectional view taken through a part of the conveyor structure showing the position of a product when initially received in the receptacle of the conveyor structure;

FIGURE 5 is a view similar to FIGURE 4 showing the product or mass being carried upwardly on an inclined portion of the conveyor structure;

FIGURE 6 is a view showing the mass engaging abutment of the conveyor structure;

FIGURE 7 is a view showing portions of a product being back rolled or tumbled rearwardly into the receptacle of the conveyor structure and portions of the material in the receptacle being conveyed under the portions being back rolled;

Figure 1:
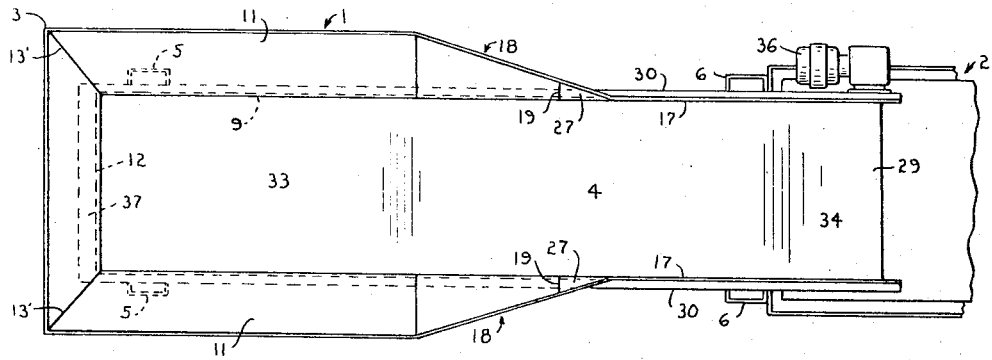
FIGURE 1 is a top view of a conveyor structure embodying the invention.
Figure 2:
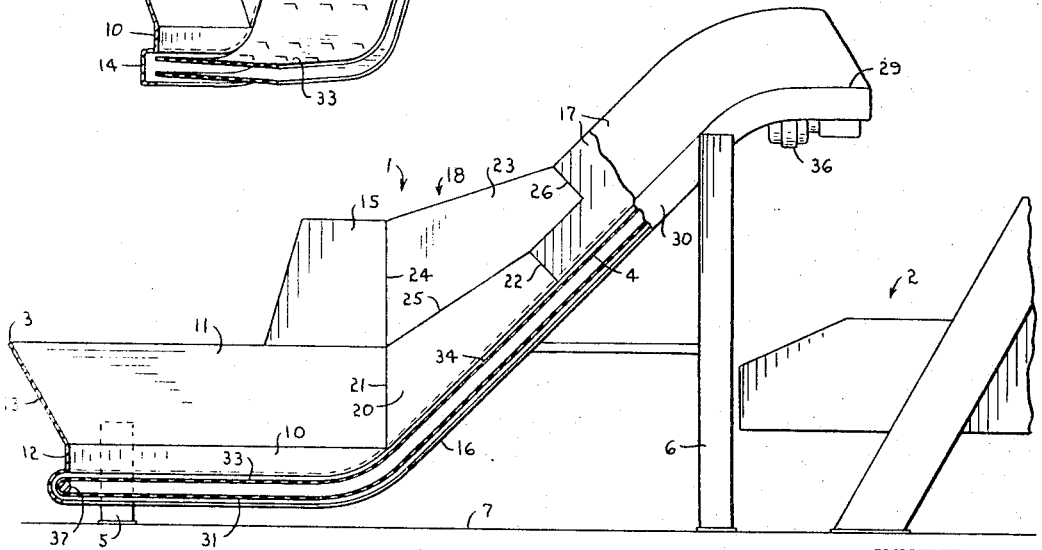
FIGURE 2 is a side elevational view of the structure illustrated in FIGURE 1 with portions thereof in section and a conditioner structure operatively associated with said structure.

As illustrated in FIGURES 1 and 2, there is shown a conveyor apparatus 1, and a conditioner or size-reducing machine 2 which are operatively connected for synchronous operation.

The conveyor apparatus or structure preferably includes a receptacle or bin 3 for initially receiving the material or product to be conveyed and a conveyor means 4. A pair of front legs 5 and a pair of braced long rear legs 6 may be utilized to support the apparatus in spaced relation to a floor 7.

Figure 3:
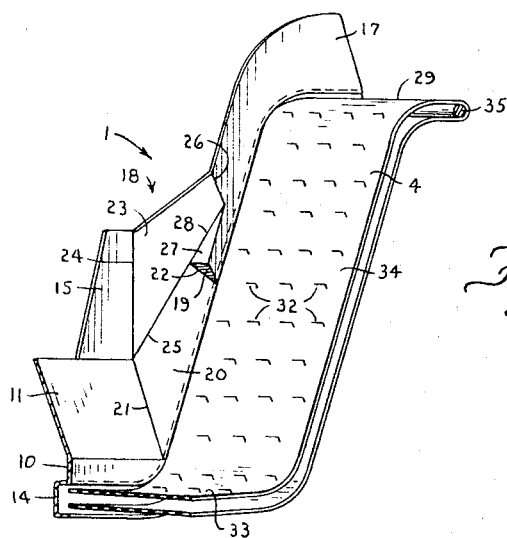
FIGURE 3 is a partial perspective view of a part of the conveyor structure with portions broken away to illustrate details of construction.

The receptacle may be designed and constructed in various ways but, as depicted in FIGURES 1, 2 and 3, it is provided with a bottom opening 9 and a pair of corresponding sides comprised of a pair of lower depending vertical walls 10 and upper divergent walls 11 constituting continuations of the lower walls, a front side having a lower vertical wall 12 and an upper wall 13 inclined upwardly and outwardly like the upper wall 11. The depending side walls 10 are preferably provided with offset channels or guideways 14 and the depending front wall 12 with an offset channel for protecting a fore end of the conveyor 4. The upper walls 11 and the inclined wall 13 are preferably joined on a bias or diagonal as indicated by the lines 13′. The receptacle also preferably includes a pair of vertical side walls 15 constituting upstanding continuations of rear extremities of the divergent walls 11 of the sides of the receptacle.

The conveyor apparatus also includes an inclined channel or guide means having corresponding side wall structures which may constitute a continuation of the receptacle and/or a separate component part of the conveyor means. The guide means is provided with a longitudinal opening 16 constituting a continuation of the opening 9 in the bottom wall of the receptacle. The guide means or channel also includes a pair of vertical parallel elongate sides 17 and a pair of side wall structures generally designated 18, the latter of which embody at least one aspect or part of the subject invention.

More particularly, the side wall structures preferably include a pair of abutment means 19 preferably in the form of triangular walls which project laterally outward or perpendicularly from the sides 17. The side wall structures also include a pair of inclined trapezoidally shaped walls 20 which project laterally outward and are joined to the upper divergent walls 11 of the receptacle along the lines 21. The walls 20 are also convergent and gradually taper toward and join with the abutment means 19 at the junction lines 22 as illustrated in FIGURES 2 and 3. The side wall structures 18 further preferably include a pair of trapezoidally shaped walls 23 which are joined to the vertical walls 15 along the vertical lines 24, to the walls 20 along the lines 25 to the sides 17 by lines 26 and to triangular walls 27 of the abutment means 19 by lines 28. The triangular walls are disposed parallel to the opening and constitute upper portions of the abutment means 19. The walls 23 are perpendicular to the horizontal and may be said to constitute bridges or continuations of the walls 15, walls 20 and sides 17. Attention is directed to the fact that the trapezoidal walls 20 and 23 taper or converge gradually toward the abutment means 19 and/or in the direction that the material or product is adapted to travel. It is also important to note that the trapezoidal walls 20 and 23 provide converging surfaces or areas which are generally disposed in a straddling relationship to the sides of the conveyor means 4. It will be evident that the lower extremity of the channel of the conveyor apparatus adjacent to and below the abutment means 19 is of a variable depth and width whereas its upper extremity beyond the abutment means is of a uniform depth and width.

The upper extremity of the channel is preferably extended to provide a rearwardly extending horizontal offset, terminus or continuation 29. The channel is provided with vertical depending walls 30 constituting a continuation of the lower depending walls 10 of the receptacle and offset guideways for the longitudinal side portions of the conveyor 4. These walls more or less form an elongate continuous underlying frame. The conveyor means 4 and guideways or track means therefor are substantially housed or disposed in the frame or between the walls 10 and 30. The conveyor means 4 may be designed and constructed as desired and may be comprised of a single endless belt 31 as shown or may be constructed in two separate sections. The endless belt 31 is preferably provided with spaced cleats or abutments 32 which are arranged in a staggered relationship in transverse and longitudinal rows. The belt includes a horizontal portion 33 substantially disposed between the walls 10 of the receptacle in relation to the opening 9 therein and a length 34 which is preferably inclined at a 45 degree angle and substantially disposed between the walls 17 and/or depending walls 30 of the channel in relation to the opening 16 therein. The rear offset 29 of the channel is preferably provided with a roller 35 which is driven by a motor 36 and the depending walls 10 under the receptacle carry an idling roller 37. The belt is supported by these rollers and on track means so that an upper continuous horizontal length of the belt is always presented for carrying the product from the receptacle against the inclined portion for travel up the latter.

As to the operation, when the conveyor belt is in motion and bulk material is deposited in the receptacle, as shown in FIGURE 4, the horizontal portion 33 of the belt will cause the mass of material to advance rearwardly and partially up the incline 34 as shown in FIGURE 5 until the leading face of the mass engages the abutment means 19 as shown in FIGURE 6. The mass moves up the incline, the angle of which is greater than the angle of repose of the material. As the speed of the conveyor belt in distance per unit of time in the horizontal portion and the inclined portion are equal, the rear motion of the horizontal is faster than the reactive horizontal movement of the material on the incline. This factor serves to bunch or gather the material on the incline, increasing the depth of the mass, as shown in FIGURE 7, and consequently the weight per square foot on the conveyor belt in the area of the incline. Concurrently the tapering or converging walls or areas and cause the material to converge and compact into a smaller area and against the abutment means as the material advances up the incline. This increases the weight of the material per square foot on the incline section of the conveyor belt.

More specifically, the more concentrated or compacted mass is pulled upwardly by the abutments, lugs or cleats 32 until the mass encounters the protruding abutment means 19. The mass having been compacted as previously described has sufficient body to prevent further appreciable compaction by the abutment means and appreciable flow and past the abutment means, thereby causing the abutment means to retard further appreciable forward motion of the total mass. The lugs therefore bite into the material tearing and pulling underlying portions thereof out from under the restricted mass. This causes the mass to further densify and move upwardly while being restrained by the abutment means. Since the mass is moving rearwardly to the abutment means but not appreciably beyond the abutment means, the mass must rise vertically. As the mass rises away from the conveyor or vertically, it approaches an angle of repose causing the mass to back-roll or tumble rearwardly for gravitation to unpack, separate or loosen the folded sheets or compacted pieces of material. Since the operation of the conveyor is continuous, the surplus material above the lugs or cleats continues to churn or revolve in a generally oval pattern as indicated by the arrows in FIGURE 7 while portions or a layer M of the material between and over the lugs attached by electrostatic charge and friction moves up the conveyor under the mass for substantial uniform distribution in the conveyor beyond the abutment means 19.

The greater the load in the receptacle or bin area the greater the depth of mass on the incline, and the greater the density of the mass the greater the delivery of material on the conveyor belt beyond the abutment means. Therefore, when greater quantities of material are delivered to the conveyor, the more material is metered or distributed for movement up the conveyor. By presetting conveyor belt speed no more material can be delivered than the capacity of the auxiliary equipment, such as the conditioner and baler, as the material would thereby spill out over the sides of the receptacle and conveyor apparatus. It is obvious therefore that the greater the amount of material delivered to the bin, the greater the amount of material is automatically metered by the conveyor apparatus without manipulation.

Figure 8:
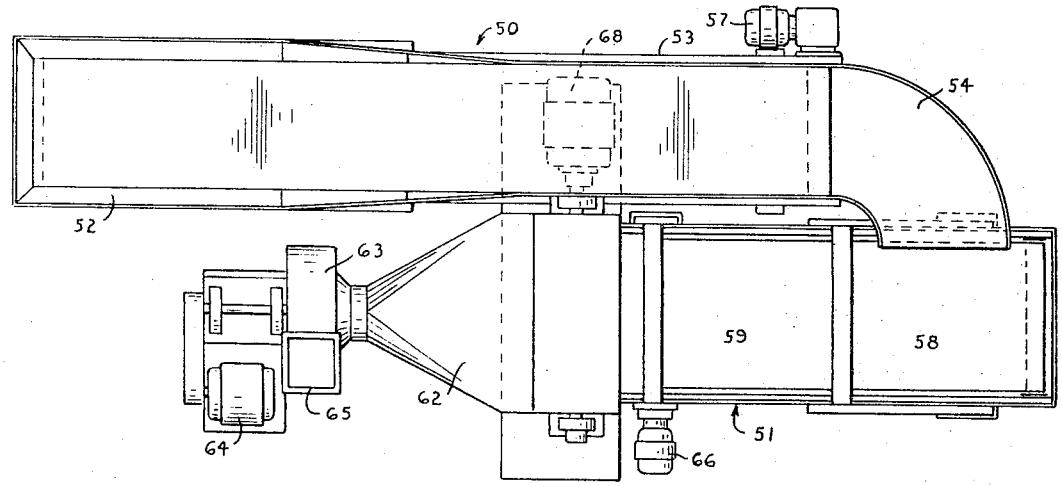
FIGURE 8 is a top view of a modified combination of conveyor structure and a conditioner.
Figure 10:
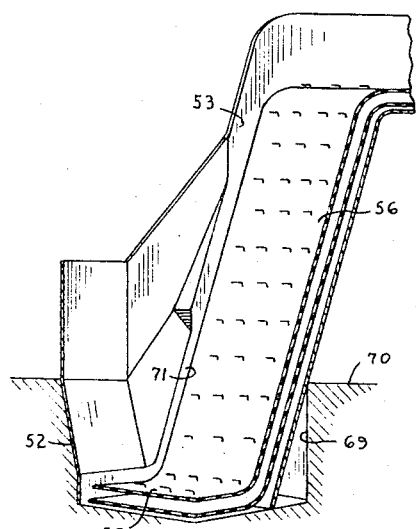
FIGURE 10 is a partial perspective view of a part of the conveyor structure depicted in FIGURES 8 and 9, with portions in section to illustrate certain details of construction.
Figure 9:
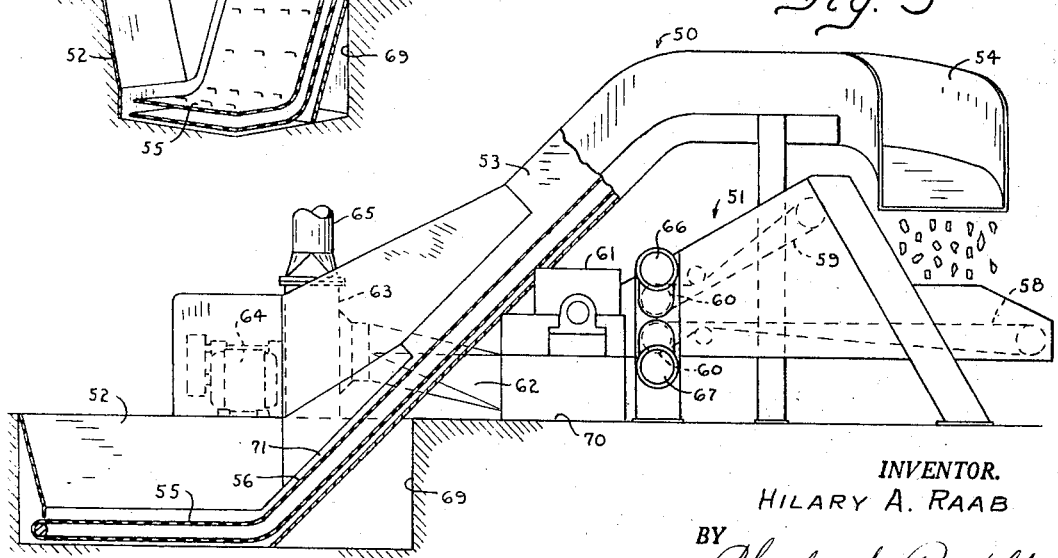
FIGURE 9 is a side elevational view of the structure shown in FIGURE 8.

Referring to the modification or embodiment of the invention illustrated in FIGURES 8, 9 and 10, there is depicted a conveyor structure generally designated 50 and an elongate size-reducing machine generally designated 51.

The conveyor structure 50 substantially corresponds to the conveyor structure above described and preferably includes a receptacle 52 and an inclined guide means or channel 53 provided with a curved outlet 54. The conveyor structure also preferably includes an endless conveyor belt which has a horizontal portion 55 disposed in the receptacle and an inclined portion 56 arranged in the guide means, with a motor 57 for driving the belt.

The size-reducing machine or conditioner 2 and the conditioner generally designated 51 preferably substantially correspond. The conditioner 51 is preferably disposed alongside or in parallel relation to the conveyor structure to save floor space and preferably includes a receiver 58 which is disposed below the curved outlet 54 for receiving material discharged from the conveyor structure. The receiver 58 is preferably in the form of a lower endless belt and as shown in FIGURES 8 and 9, an upper endless belt 59 is operatively associated with the lower belt 58 in a generally converging relationship so that the material received by the conditioner is convergingly compressed between a pair of rollers 60 for directing the material to a unit 61 which reduces or otherwise conditions the material for discharge through a funnel-like housing 62 to exhauster 63 driven by a motor 64 for directing conditioned material out through a duct 65 to a desired location such as a baler. Motors 66 and 67 serve to respectively operate the rollers or shafts 60 and a motor 68 drives the unit 61.

It will be noted that the machine or conditioner 51 is arranged in a generally parallel relation to the conveyor structure 50 and that the receptacle 53 and a lower portion of the guide means or channel 53 of the conveyor are disposed in a well 69 below floor level 70, as distinguished from the organization illustrated in FIGURES 1, 2 and 3.

Attention is also directed to the fact that the side wall structures of the guide means for the inclined portion of the conveyor are also provided with elongate vertical parallel walls or portions 71 which extend below and from the abutment means 19 to a location adjacent the junction between the horizontal and inclined portions of the conveyor. In other words, the elongate portions define what may be termed a lower or secondary channel-like formation under the abutment means so as to insure a more uniform travel and positive presentment of the material to the abutment means in order that portions or a layer of the material will travel under the mass being back rolled. This insures a predetermined flow or volume of the material past the abutment means for delivery to the conditioner.

It should be further observed that the curved outlet 54 of the conveyor structure is curved to direct the product laterally and downwardly onto the receiver 59 and that the distance between the terminus of the outlet and the receiver is predetermined so that the material will gravitate onto the receiver and thereby assist in further conditioning the material by loosening it prior to being subjected to the size-reducing unit.

Having thus described my invention, it is obvious that various modifications may be made in the same without departing from the spirit of the invention and, therefore, I do not wish to be understood as limiting myself to the exact forms, constructions, arrangements, and combinations of parts herein shown and described.

I claim:

1. A conveyor assembly for the purpose described, said assembly comprising a receptacle for receiving compactible material, said receptacle being provided with an inclined elongated continuation extending therefrom, an endless conveyor having a horizontal portion disposed in said receptacle and an inclined portion in said continuation, said continuation having means serving to compact the material at a predetermined area, and abutment means carried by said continuation at a location intermediate its length and adjacent said area and said inclined portion for directing the material carried by said inclined portion back into said receptacle for loosening said material in and so that said horizontal portion will re-convey such loosened material back up said inclined portion for substantially uniform discharge therefrom at a location beyond said abutment means.

2. The conveyor assembly defined in claim 1, in which said inclined continuation of said conveyor is provided with a substantially horizontal extension disposed substantially in parallel relation to its horizontal position.

3. The conveyor assembly defined in claim 1, in which said receptacle and a portion of said continuation are disposed in a well.

4. The conveyor assembly defined in claim 1, including a machine disposed adjacent said conveyor assembly for receiving and reducing the size of the material discharged from said conveyor assembly, and at least a portion of said receptacle of said conveyor assembly is disposed in a well below the level of said machine.

5. A stationary conveyor assembly of the character described, said assembly comprising a receptacle for receiving compacted material, a pair of spaced longitudinal side wall structures constituting inclined continuations of said receptacle and provided with converging members for compacting the material at a predetermined area, a conveyor having a horizontal portion disposed in said receptacle and an inclined portion disposed between said side wall structures, and said side wall structures being provided with means located intermediate their lengths and adjacent said area and said inclined portion of said conveyor for tumbling material carried by said inclined portion back into said receptacle for loosening such material for re-travel on said horizontal portion and back up said inclined portion for substantially uniform distribution thereon at a location beyond said means for discharge from said portion.

6. The conveyor assembly defined in claim 5, in which said side wall structures include elongated wall portions which are inset from said means and extend in opposite directions therefrom whereby to assist in causing the loosened material to travel under the material that is being tumbled.

7. A conveyor assembly of the kind described, said assembly comprising a stationary receptacle for receiving compacted flowable material, a pair of spaced inclined longitudinal wall structures extending from said receptacle, a conveyor having a horizontal portion disposed in said receptacle and an inclined portion extending lengthwise between said side wall structures, means disposed externally of said receptacle carried by said side wall structures at a location intermediate their lengths and closely related to sides of said inclined portion of said conveyor in a manner whereby to offer resistance at a predetermined area to the flow of the material up said inclined portion, and means adjacent said area for converging the material against said first-mentioned means in a manner whereby to further compact the material and impart a back rolling action thereto for returning the material to said receptacle and loosening such material for re-travel on said horizontal portion and substantially uniform distribution on said inclined portion for eventual discharge from said inclined portion at a location beyond said resistance means.

8. A conveyor assembly defined in claim 7, in which the returned loose material travels on said inclined portion under that portion of the material which is being back rolled into said receptacle.

9. In combination: means for conditioning a material and a conveyor assembly for the material, said conveyor assembly comprising a stationary receptacle for receiving pieces of compacted sheet material, a pair of spaced inclined longitudinally extending side wall structures operatively associated with said receptacle, conveyor means having a horizontal portion disposed in said receptacle and an inclined portion extending longitudinally between said side wall structures, a pair of abutment means respectively associated with lower portions of said side wall structures at locations intermediate their lengths for offering resistance to the flow of the material up said inclined portion, and means operatively associated with said abutment means whereby to assist in converging the material thereagainst whereby to effect a gravitational return of the pieces down a lower portion of said inclined portion and into said receptacle and thereby loosen the sheets so that they may be re-conveyed by said horizontal and inclined portions and substantially uniformly distributed upon the latter past said abutment means for further travel to said conditioning means.

10. In combination: a relatively large open topped stationary receptacle for receiving compactible material, conveyor means having an elongated inclined portion extending from said receptacle and a horizontal portion disposed in the bottom of said receptacle for conveying the material thereon and up said inclined portion, means disposed externally of said receptacle and intermediate the length of said inclined portion whereby to simultaneously compact and retard upward travel of the material on said inclined portion for causing such material to tumble back down a lower portion of said inclined portion and into said receptacle to loosen such material so that said horizontal portion will cause said loosened material to travel back up said inclined portion in order that some of the loosened material will be recirculated back into said receptacle by said tumble means and some of the material travels beyond said tumble means for substantially uniform discharge from said inclined portion.

11. In combination: a relatively large open topped receptacle for receiving compacted material, a pair of spaced inclined longitudinal side wall structures extending upwardly from said receptacle and constituting continuations thereof, conveyor means movable relative to said receptacle and side wall structures having a portion disposed in a lower part of said receptacle and an inclined portion extending longitudinally between said side wall structures, a pair of abutment means disposed externally of said receptacle respectively carried by said side wall structures and located in relatively close relation to the sides of said inclined portion, said side wall structures also being provided with surfaces which converge toward said abutment means, the arrangement being such that when material is fed to said receptacle, it will be conveyed by said horizontal portion to said inclined portion for travel up the latter for gradual compression by said converging surfaces against said abutment means to retard movement of the material at a location intermediate the length of said side wall structures in a manner whereby it is directed away from the said inclined portion and back rolled down a lower portion of said inclined portion into said receptacle to loosen the material so that it may be substantially uniformly distributed on said inclined portion for travel thereon.

12. Conveyor apparatus adapted for association with a receptacle adapted to receive flowable interlocked pieces of material, said conveyor apparatus including an endless conveyor belt having a lower portion adapted for disposition in said receptacle and an inclined portion, a pair of spaced side wall structures mounted in an inclined position in relation to said inclined portion, said side wall structures being respectively provided with abutment means intermediate their lengths and with a pair of converging surfaces located adjacent said abutment means, the arrangement being such that when material is placed on said lower portion it is conveyed against and up inclined portion in a manner whereby said converging surfaces force the material against said abutment means whereby the latter direct the material laterally away from said inclined portion for unlocking said pieces.

13. In combination: an elongate structure inclined in the neighborhood of 45° with respect to the horizontal for receiving a relatively light weight material for travel in one direction and provided with abutment means intermediate its extremities, said abutment means having impact surfaces which are disposed substantially perpendicular to the direction of travel for engagement by the material, inclined conveyor belt means supported by said structure and provided with abutments, and means for driving said conveyor means for carrying the material for compaction against said abutment means for forming a relatively large back-rolling relatively fluffy mass so that said abutments will force underlying portions of this mass for substantially uniform distribution on said conveyor means beyond said abutment means and the mass being compacted.

14. A method for the purpose described comprising: conveying a compactible material up an inclined portion of an endless belt disposed in the neighborhood of 45° with respect to the horizontal, offering resistance to the travel of the material thereon at a location intermediate its length, compressing the material against said resistance means to cause the material to fall back an appreciable distance down said incline and unpack, and then causing said unpacked material to re-travel said incline under the material being compressed to a location therebeyond.

15. A method for the purpose described comprising the steps of: moving compacted material up an inclined portion of endless belt conveyor means, offering resistance to the upper travel of the material on said inclined portion at a location adjacent and intermediate its length, forcing the material against said resistance means whereby the latter imparts a back-rolling action to the material to loosen same, and reconveying the back-rolled loose material for re-travel on said inclined portion and beyond said resistance means for discharge.

16. A method for the purpose described comprising the steps of: moving compacted material up an inclined portion of an endless belt conveyor, offering resistance to the upward travel of the material on said inclined portion at a location intermediate its length, forcing the material against said resistance means whereby the latter imparts a downward back-rolling action to the material an appreciable distance over a lower portion of the conveyor to loosen the material, and re-conveying the back-rolled loose material for re-travel on said inclined portion and beyond said resistance means.

17. A method for the purpose described comprising: conveying a compacted material up an elongated endless belt having an incline of substantially 45° with respect to the horizontal, offering resistance to the travel of the material thereon at a location intermediate its length, converging the material against the resistance means whereby the latter causes the material to back-roll and unpack, and then causing the unpacked material to re-travel said incline in a manner whereby the material caused to back-roll and re-travel said incline will move in a generally oval-like path.

18. A method which comprises moving a material up an inclined portion of an endless belt conveyor disposed at an angle of substantially 45° with respect to the horizontal, compacting the material during its travel thereon to form a large back-rolling mass extending appreciably over a lower extremity of the conveyor, and forcing underlying portions of the mass forwardly for substantially uniform distribution on said conveyor beyond the mass.

References Cited

UNITED STATES PATENTS

| 999,419 | 8/1911 | Van Wert | 198—198 |
| 2,543,519 | 2/1951 | Baechli | 198—57 |
| 2,617,514 | 11/1952 | Bebinger | 198—14 |
| 3,063,545 | 11/1962 | Schreyer | 198—204 |

RICHARD E. AEGERTER, *Primary Examiner.*

ANDRES H. NIELSEN, *Examiner.*